(12) United States Patent
Hattery et al.

(10) Patent No.: US 11,025,988 B2
(45) Date of Patent: *Jun. 1, 2021

(54) INTEGRATION OF LIVE STREAMING CONTENT WITH TELEVISION PROGRAMMING

(71) Applicant: Facebook, Inc., Menlo Park, CA (US)

(72) Inventors: Tyler Michael Hattery, Park Ridge, IL (US); Kathryn Allen, Chicago, IL (US); Jeremy Smallwood, Oak Park, IL (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,541

(22) Filed: Nov. 6, 2019

(65) Prior Publication Data
US 2020/0077147 A1    Mar. 5, 2020

Related U.S. Application Data

(63) Continuation of application No. 15/862,079, filed on Jan. 4, 2018, now Pat. No. 10,506,287.

(51) Int. Cl.
*H04N 21/458* (2011.01)
*H04N 21/462* (2011.01)
(Continued)

(52) U.S. Cl.
CPC .......... *H04N 21/458* (2013.01); *G06Q 50/01* (2013.01); *H04N 21/44016* (2013.01); *H04N 21/4622* (2013.01); *H04W 4/21* (2018.02)

(58) Field of Classification Search
CPC .......... H04N 21/458; H04N 21/44016; H04N 21/4622; H04N 21/812; H04N 21/2668; H04N 21/4126; H04N 21/44222; H04N 21/23418; H04N 21/4788; H04N 21/4532; H04N 21/8456; H04N 21/23424; H04N 21/4316; H04N 21/4722; H04N 21/8133;
(Continued)

(56) References Cited

U.S. PATENT DOCUMENTS

2010/0306655 A1* 12/2010 Mattingly ............. G06F 3/0482
715/720
2012/0174032 A1* 7/2012 Greene ................ G06Q 50/01
715/811
(Continued)

*Primary Examiner* — Cynthia M Fogg
(74) *Attorney, Agent, or Firm* — Baker Botts L.L.P.

(57) ABSTRACT

In one embodiment, a method includes a computing system generating a forum for a discussion regarding a television program among a plurality of users watching the television program. The television program may be aired on a plurality of first devices. The system may provide, on a plurality of second devices of the users watching the television program, a user interface comprising the forum and one or more affinity indicators for expressing user emotions relating to the television program. The system may receive, from a second device of a user, user input indicating a comment or a user emotion relating to the television program through the one or more affinity indicators. The system may distribute in real-time the comment or the user emotion relating to the television program received from the second device of the user across other second devices of the users watching the television program.

20 Claims, 11 Drawing Sheets

(51) Int. Cl.
*H04N 21/44* (2011.01)
*G06Q 50/00* (2012.01)
*H04W 4/21* (2018.01)

(58) Field of Classification Search
CPC ............. H04N 21/252; H04N 21/8586; H04N 21/2187; H04N 21/242; H04N 21/2665; H04N 21/41407; H04N 7/157; H04N 21/44226; H04N 21/858; H04N 21/4882; H04W 4/21; G06Q 50/01
USPC .......................................................... 725/48
See application file for complete search history.

(56) References Cited

U.S. PATENT DOCUMENTS

2014/0173462 A1\* 6/2014 Mattingly ........... G06F 3/04847
                                                                 715/753
2017/0303008 A1\* 10/2017 Champy ............... G06F 3/0346

\* cited by examiner

INTEGRATION OF LIVE STREAMING CONTENT WITH TELEVISION PROGRAMMING

PRIORITY

This application is a continuation under 35 U.S.C. § 120 of U.S. patent application Ser. No. 15/862,079, filed Jan. 4, 2018, which is incorporated herein by reference.

TECHNICAL FIELD

This disclosure generally relates to systems and methods for streaming live content through a platform.

BACKGROUND

It has been observed that during television's prime-time hours, usage of mobile device increases, and usage further spikes at times that coincide with breaks in the broadcast television programs. In one scenario, while watching a television program of interest, a user may pay full attention to the television program. When there is a break in the television program, the user may divert his attention from the television screen to his mobile device, through which the user may surf the Web, check email, read newsfeeds, etc. The user may "kill time" in this manner until the television program of interest resumes from the break. However, the activity undertaken by a typical user is usually disassociated with the user's primary activity of watching the television program. As such, the overall experience of watching a television program is typically incongruous and disjoint.

SUMMARY OF PARTICULAR EMBODIMENTS

Particular embodiments described herein relate to systems and methods for providing television users with mobile content related to the televised program that they are watching, thereby providing a seamless, integrated viewing experience across platforms. In particular embodiments, while a television program is being aired, a social-networking system may be configured to concurrently provide live-content streams related to the television program through the social-networking platform. In addition, the social-networking system may predict when breaks in a television program would likely occur. Based on an anticipated break time, the social-networking system may send notifications to users who are likely interested in the television program, thereby directing them to the related live-content that is being streamed. Through the live streaming platform, users may watch content that is directly related to what they just witness on television and interact with other users who are watching the same program. The embodiments described herein, therefore, bridge a divide between unrelated content-distribution platforms (e.g., television and mobile content) with different content sources and provide end users with an integrated, continuous viewing experience.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

It has been observed that usage of mobile device increases during television's prime-time hours and further spikes during breaks in television programs. This suggests that while television programs continue to attract a large audience, competing content that is readily available through mobile devices pulls television users away from the televised programs whenever possible, such as when a program of interest is on break. It has further been observed that when television users use their mobiles while watching a television program, they are engaged with social-networking activities, such as checking newsfeeds, posts, and other content provided through a social-networking platform. The mobile content consumed, however, is typically unrelated to the television program being watched. From the perspective of television users, this may be undesirable as the overall television viewing experience is disjoint and broken up by the breaks (e.g., a user may be engrossed in a televised story for 10 minutes, then break away for 3 minutes to catch up with friends via social media, and so on). From the perspective of providers of television programs, it is undesirable for users to tune away from the televised content during breaks. However, currently there is no solution that addresses these problems.

Particular embodiments described herein address the aforementioned problems by providing a platform configured to synchronize and integrate mobile content with televised content. In particular embodiments, systems and methods distribute, through a social-networking platform, live streaming content that is synchronized with a television program that is being broadcast. In particular embodiments, a social-networking system may anticipate when breaks in a television program would begin, and accordingly send targeted notifications to users prior to such breaks to direct them to the live streaming content that is related to the television program. Thus, one aspect of the embodiments provides a user with mobile content related to the televised program that he/she is watching, thereby providing a seamless, integrated viewing experience.

Figure 1A:
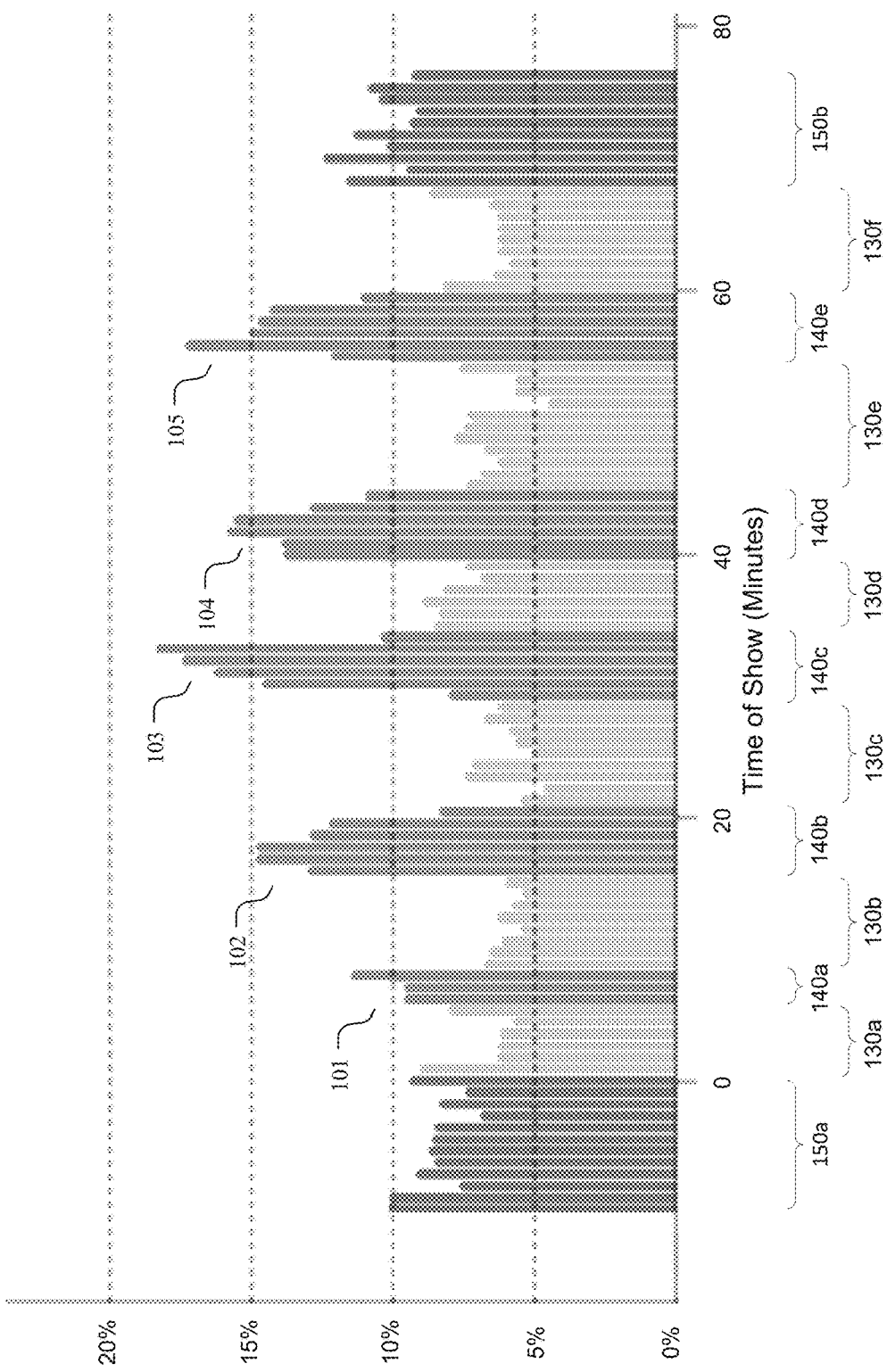
FIGS. 1A-1B illustrate a graph showing user activity through a social-networking platform during a television program.
Figure 1B:
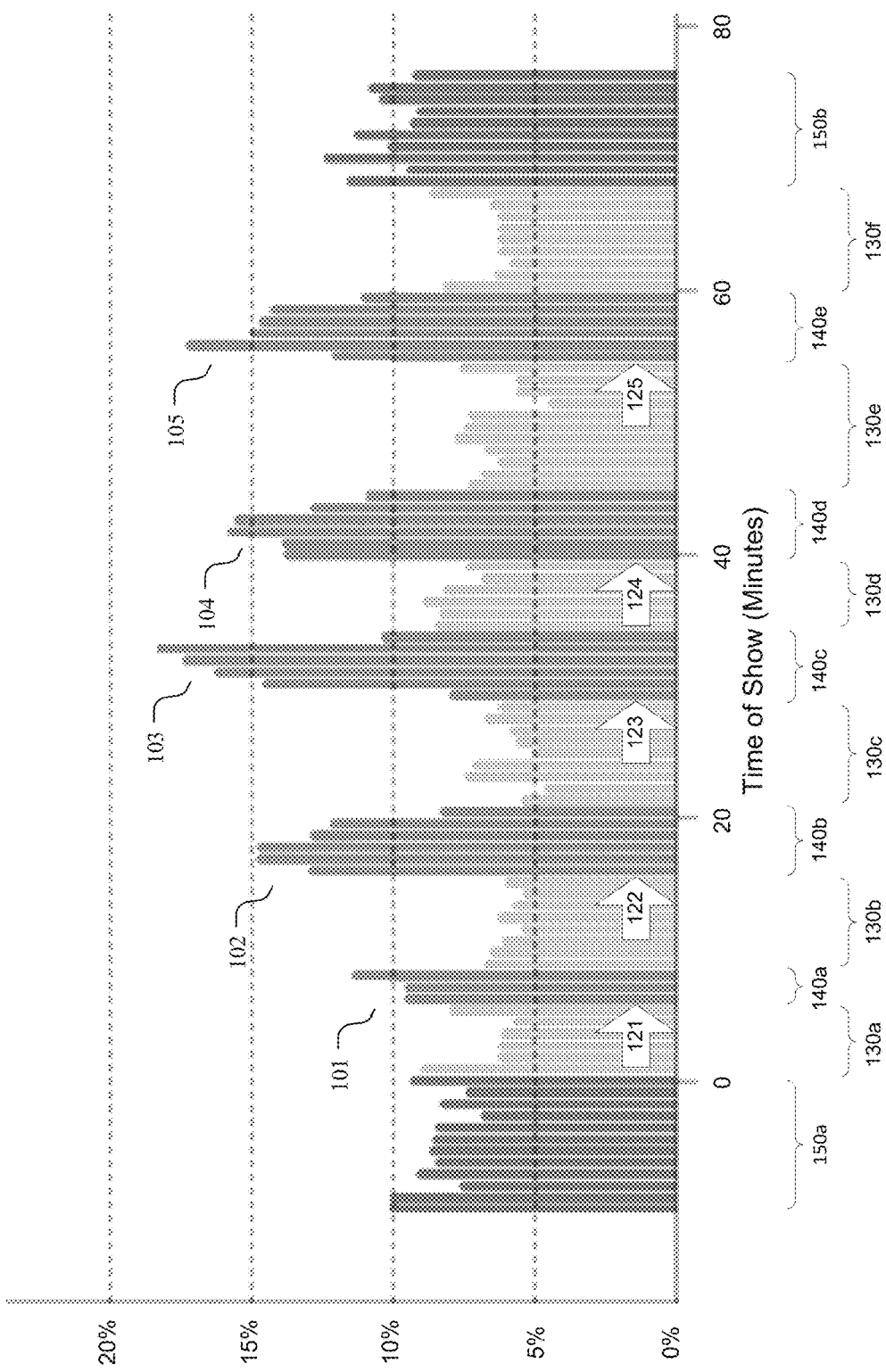

FIG. 1A illustrates a graph 100 showing user activity through a social-networking platform during a popular televised program. The x-axis of the graph 100 represents a timeline of the television program, with 0 representing the start of the program. The television program is aired during the time periods 103a-f, with intermittent breaks 140a-e. The time periods 150a and 150b correspond to the ending of a prior program and the beginning of a subsequent program, respectively. The graph 100 shows five spikes 101, 102, 103, 104, 105 in user activity during the television program, each of which increases drastically and, shortly thereafter, drops drastically. It has been observed that the timing and duration of these spikes 101, 102, 103, 104, 105 generally correspond to the breaks 140a-e, respectively, in a popular televised program. FIG. 1B illustrates the same graph 100 shown in FIG. 1A, but with markers that indicate the approximate times at which the spikes 101, 102, 103, 104, 105 start. As shown, the start times 121, 122, 123, 124, 125 of spikes 101, 102, 103, 104, 105 are roughly 7 minutes, 17 minutes, 28 minutes, 39 minutes, and 55 minutes into the television program, respectively.

Particular embodiments take advantage of the observation shown in FIGS. 1A-1B and provide a content-distribution platform that is synchronized with anticipated breaks in a television program. As will be described in further detail below, a social-networking platform may predict breaks in a television program and, prior to each anticipated break, send notifications to user devices to direct them to live streaming content that is related to the television program being aired.

Figure 2A:
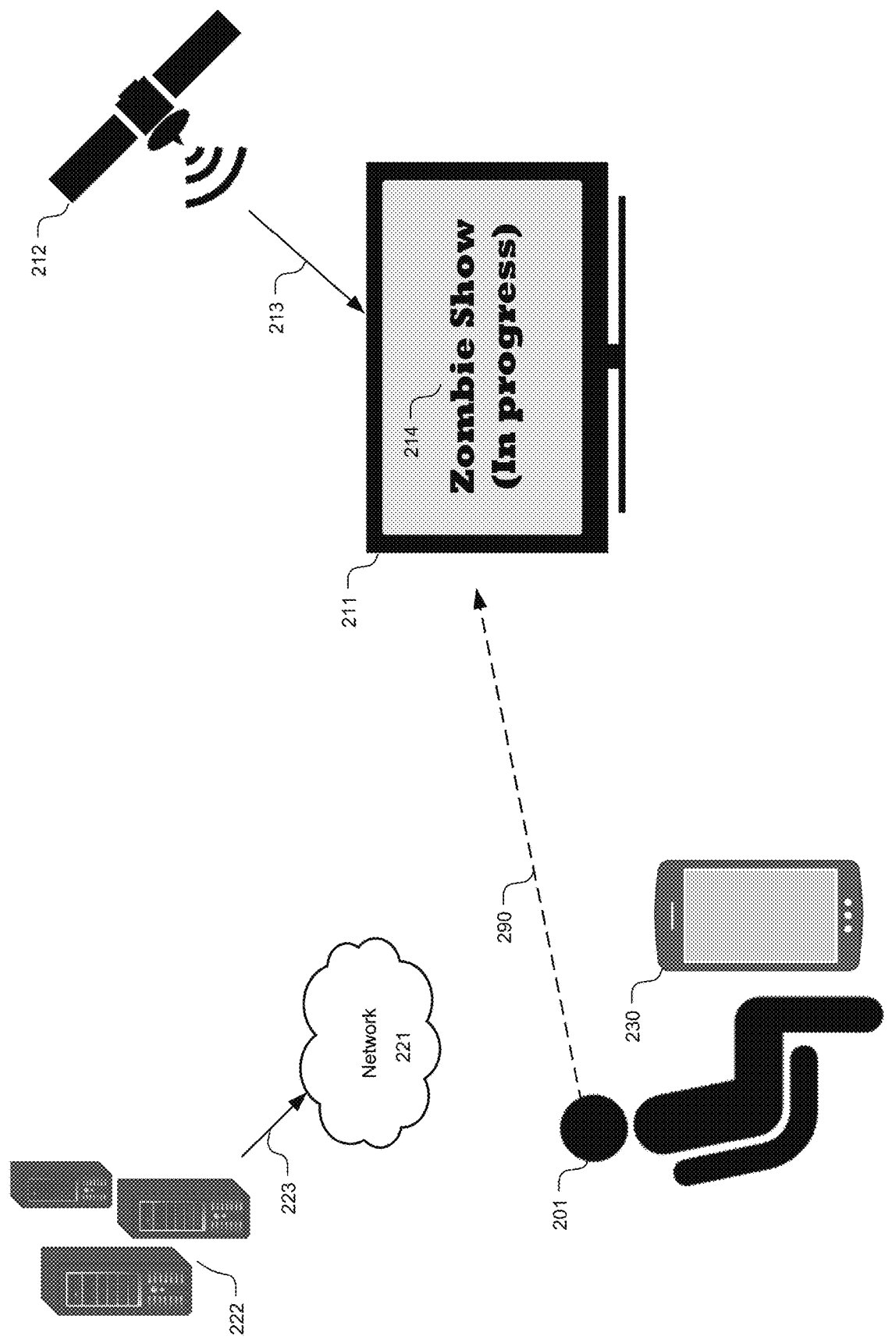
FIGS. 2A-2C illustrate an example of an integrated viewing experience in accordance with particular embodiments.
Figure 2B:
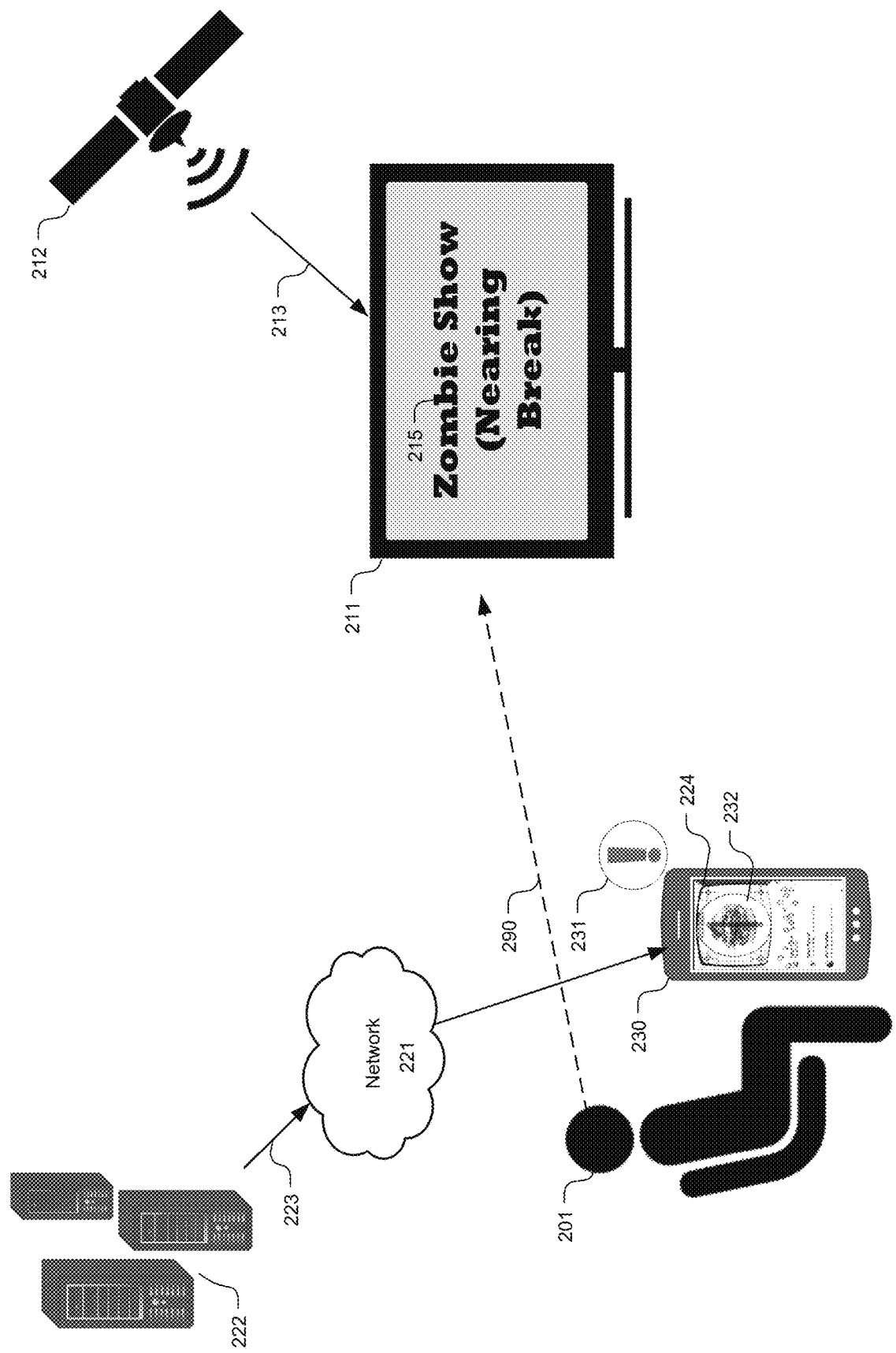
Figure 2C:
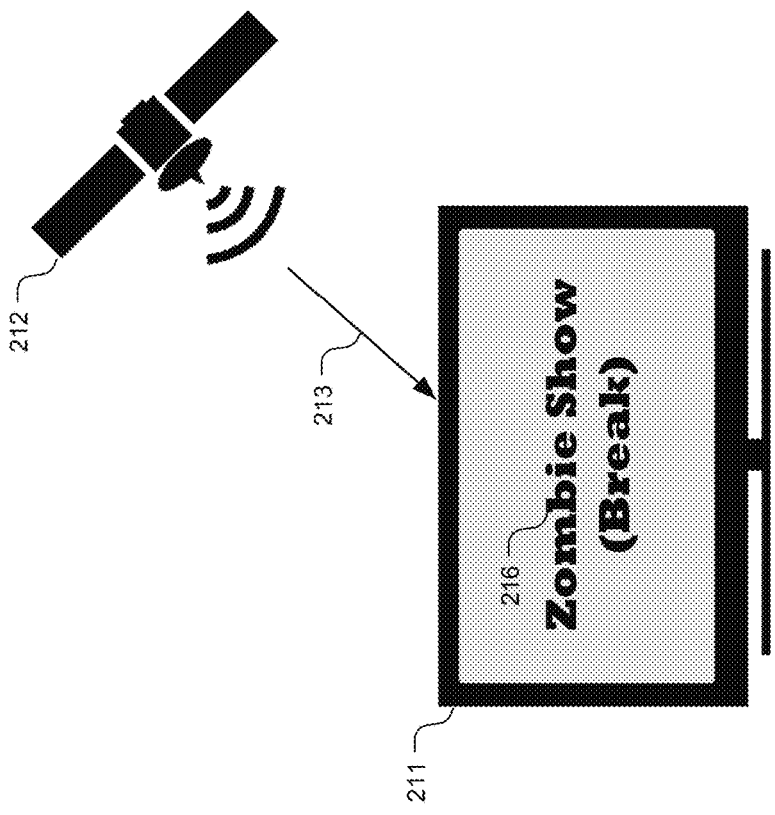
Figure 2C:
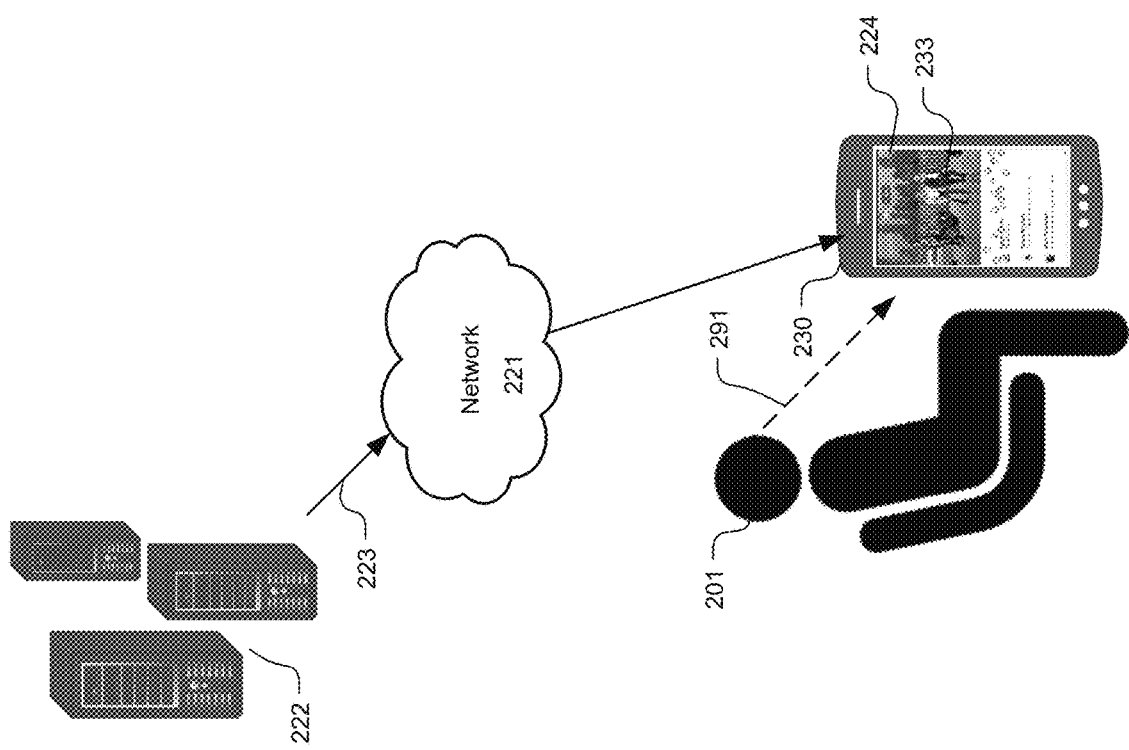

FIGS. 2A-2C illustrate an example of an integrated viewing experience in accordance with particular embodiments. FIG. 2A illustrates an example scenario where a user 201 is watching 290 a zombie television program 214 that is currently in progress. In the example shown, the program 214 is distributed by a satellite 212 to a television set 211 through a satellite link 213. It should be understood that many other ways of distributing the television program 214 may be employed, including, for example, over-the-air terrestrial broadcasts, cable television, or set-top-boxes. The user 201 has a mobile device 230, which is configured to communicate with a social-networking system 222. The social-networking system 222 may send 223 data through a network 221, such as the Internet, cellular network, local-area network, wide-area network, and any other suitable communication networks. In the scenario depicted in FIG. 2A, the user 201 is watching 290 the in-progress zombie show 214 and is not at the moment engaged with his mobile device 230.

FIG. 2B illustrates a scenario showing what may occur when the zombie show is nearing a break 215, according to particular embodiments. The social-networking system 222 may anticipate the start time of a break in the television program. At a predetermined amount of time prior to the anticipated start time of the break, the social-networking system 222 may transmit a notification 231 to the user's device 230. The notification 231 may be surfaced to the user 201 through an application installed on the device 230, such as a social-networking application associated with the social-networking system 222, text message, phone call, e-mail, or any other suitable communication channels. The notification 231 may include a message that informs the user 201 that live streaming content related to the zombie show 215 is about to begin. The notification 231 may further include a link that, upon activation, would direct the user 201 to a user interface with a live streaming channel 224 through which the live streaming content may be transmitted and displayed. When the television program is airing the actual program, the live streaming channel may display intermission content 232 received from the social-networking system 222, according to particular embodiments.

FIG. 2C illustrates a scenario showing what may occur when the zombie show is on break 216, according to particular embodiments. During break, the user 201 may no longer be watching the television set 211 and may instead be looking at 291 the mobile device 230. In particular embodiments, when the zombie show is on break 216, the social-networking system 222 may distribute live content 233 related to the zombie show through the live streaming channel 224. Since the live content being streamed 233 continues to relate to the zombie show, the user 201 is provided with a continuous overall viewing experience. Further, from the perspective of the content provider of the zombie show 216, the live streaming content provides a means to recapture viewership that may otherwise be lost during breaks. As such, embodiments described herein may provide television content providers an opportunity to maintain connection with users, even during breaks.

Figure 3A:
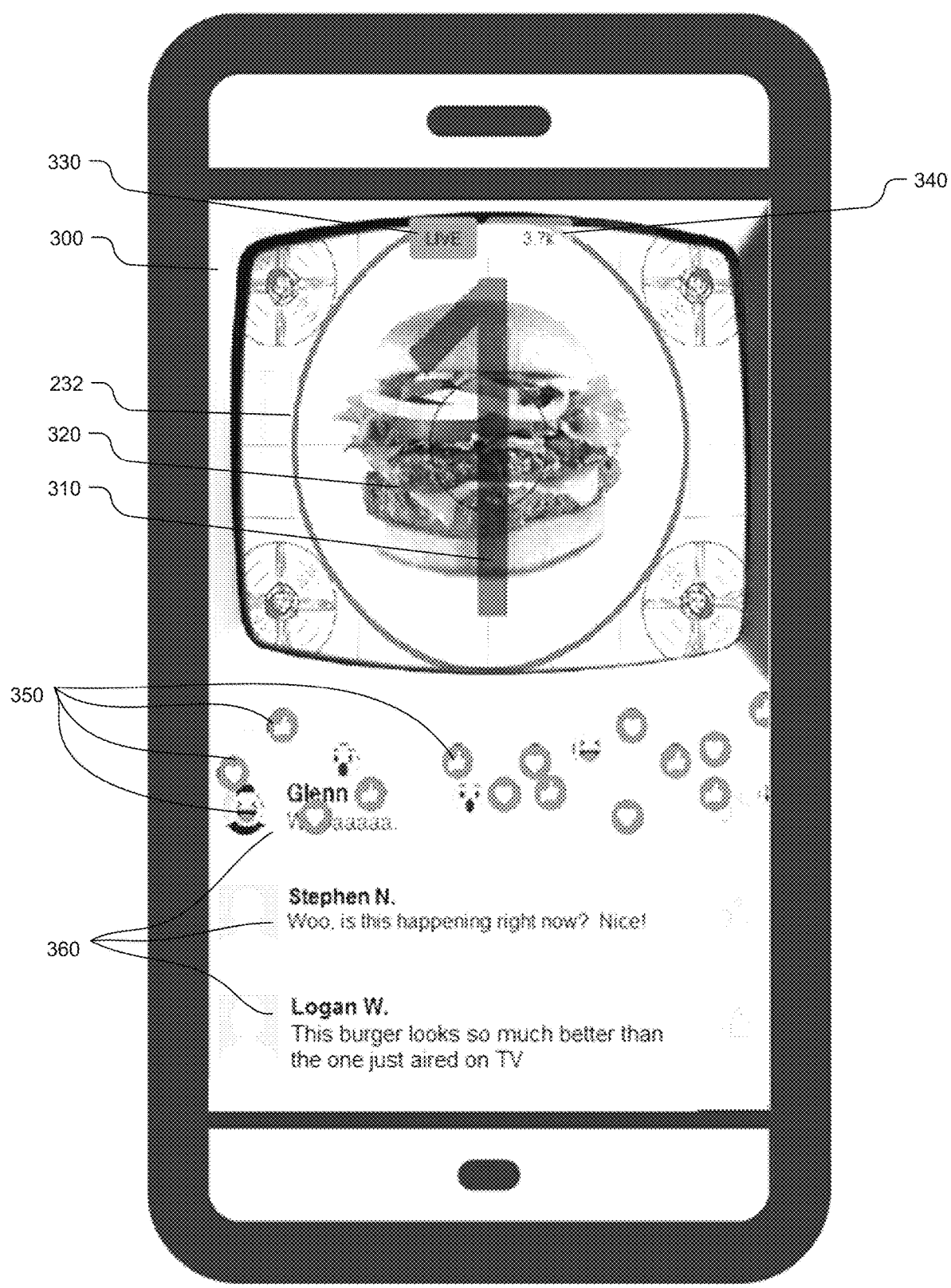
FIGS. 3A-3B illustrate examples of live streaming content and the associated user interface, according to particular embodiments.
Figure 3B:
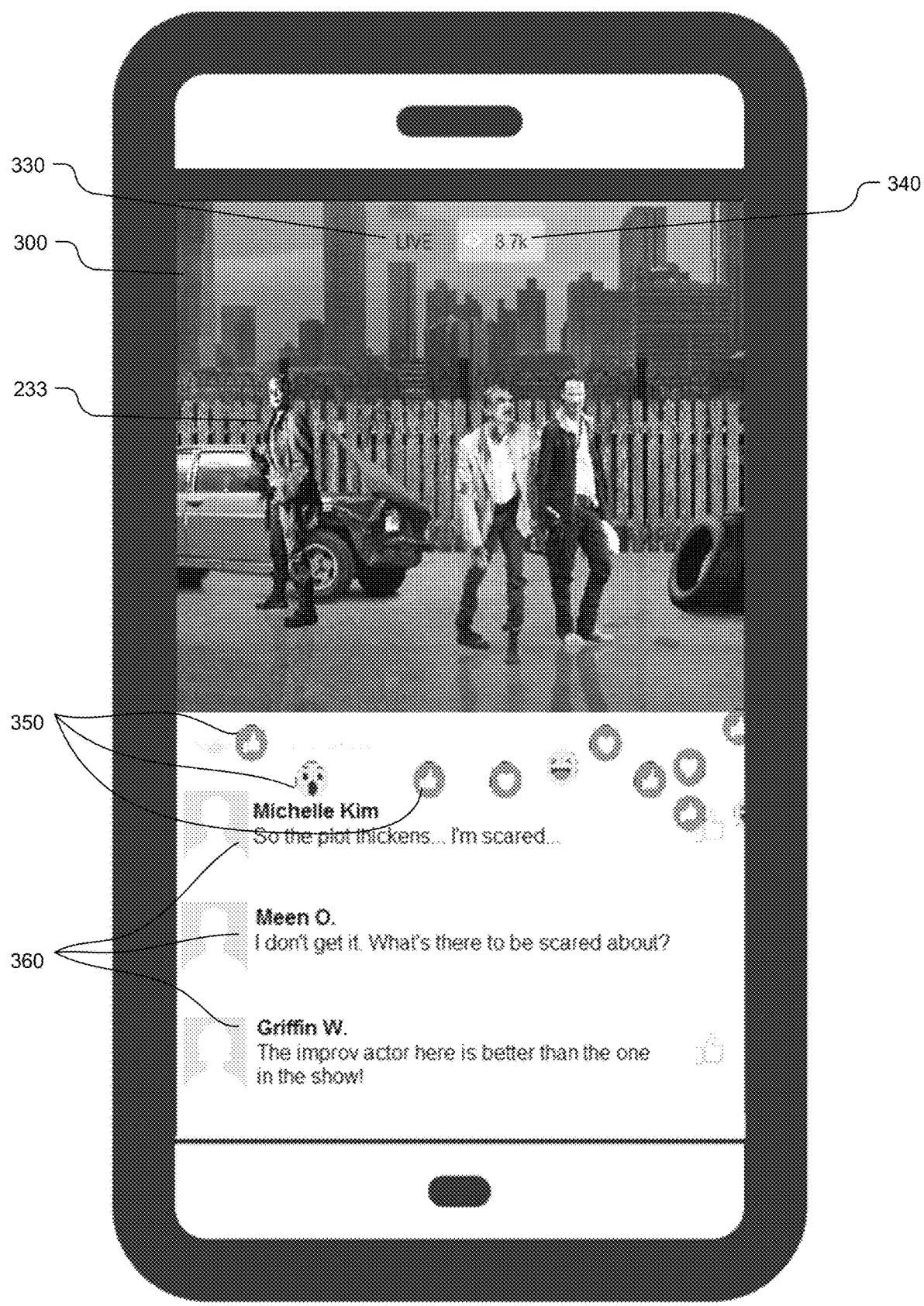

FIGS. 3A-3B illustrate examples of live streaming content and the associated user interface 300, according to particular embodiments. FIG. 3A illustrates live streaming content that may be displayed while a television program is airing the primary content (i.e., it is not yet on break). As an example, intermission content 232 may be displayed. The intermission content 232 may include count-down information 310 representing the duration until the live content 233 begins. This count-down information 310 may be dynamically generated in real-time based on the start time of the anticipated break of the associated television program. In particular embodiments, the intermission content 232 may include product placements 320 and other associated information, which may relate to and be coordinated with products displayed through the television program. In particular embodiments, the user interface 300 may include information such as a live indicator 330 for indicating that the content shown is live, and a user count 340 that indicates the number of users currently streaming the content.

In particular embodiments, the user interface 300 may further provide a forum through which users of the associated television program may interact. This is different from the conventional television-watching experience, where users are isolated from each other by their respective locations. Embodiments described herein, therefore, provide a mechanism to bring together users who are sharing a common experience of watching a television program. In particular embodiments, users, through the user interface 300, may post one or more affinity indicators (e.g., an affinity indicator may express the posting user's surprise, liking, anger, excitement, amusement, etc.). In particular embodiments, upon receiving the affinity indicators from the viewing users, the social-networking system may overlay corresponding emoticons 350 or other graphical representations of affinity over the live content so that each user may see the collective reactions of all users. In particular embodiments, the emoticons 350 may be shown, in real-time, as a stream of emoticons flowing across the screen, with spacing between emoticons reflecting their respective posting times (e.g., FIGS. 3A and 3B illustrate emoticons 350 at different time periods). In particular embodiments, the user interface 300 may further enable users to post comments 360 and start conversation threads. The comments and conversations may relate to the television program and/or the live content being streamed. Comments 360 posted by users may be displayed, in real time, across the users' respective user interfaces 300 (e.g., FIGS. 3A and 3B illustrate comments 360 posted at different times).

FIG. 3B illustrates live streaming content that may be displayed during a break in the television program. Anticipating the break, the social-networking system may begin streaming live content 233 related to the television program based on when the break begins (e.g., the live content may begin streaming at, shortly before, or shortly after the anticipated time of the break). In particular embodiments, the social-networking system may receive the live content 233 from a computing device that is receiving and processing video data from a camera. The computing device may encode the live video data and transmit the encoded video data to a streaming server associated with the social-networking system. In turn, the streaming server may transmit the encoded video to any user who has established a streaming session or channel with the server.

In particular embodiments, the social-networking platform may be configured to enable any interested party to provide the live content 233. For example, the live content 233 may be provided by an entity associated with the social-networking platform, a content-providing partner, or a user of the social network. If interested, an entity associated with the television program may be the one who provides the live content 233. In this case, further content coordination between the television program and the live content 233 may be achieved. For example, products displayed during a television break may be concurrently displayed (e.g., in a banner) in the live content 233. In particular embodiments, whoever provides the live content 233 may register with the social-networking platform, indicating that it wishes to provide live content related to a particular television program. In response, the social-networking platform may assign a streaming channel for the live content and associated it with the television program. When the television program is being aired, the social-networking platform may send out notifications prior to anticipated breaks and direct users to the assigned streaming channel. In particular embodiments, the social-networking platform may associate a limited number of live content channels with the television program.

The live content 233 may be, for example, behind-the-scenes footages of the associated television program, conversation around the scenes that viewers of the television program just witness prior to the break, commentary around the television program's actors or plot, an extended improv scene that conventional television viewers would not see, and any other relevant content that viewers of the television program may find interesting. In particular embodiments, the live content 233 may be streamed during times that substantially coincide with breaks in the related television program, or it may be continuously streamed throughout (or beyond) the duration of the television program. For instance, the live content 233 may stream continuously even while the main television program of interest is being aired (i.e., when the program is not on break). This may provide users with concurrent entertainment from both the television program and the live content, with the live content supplementing the television program.

Figure 4:
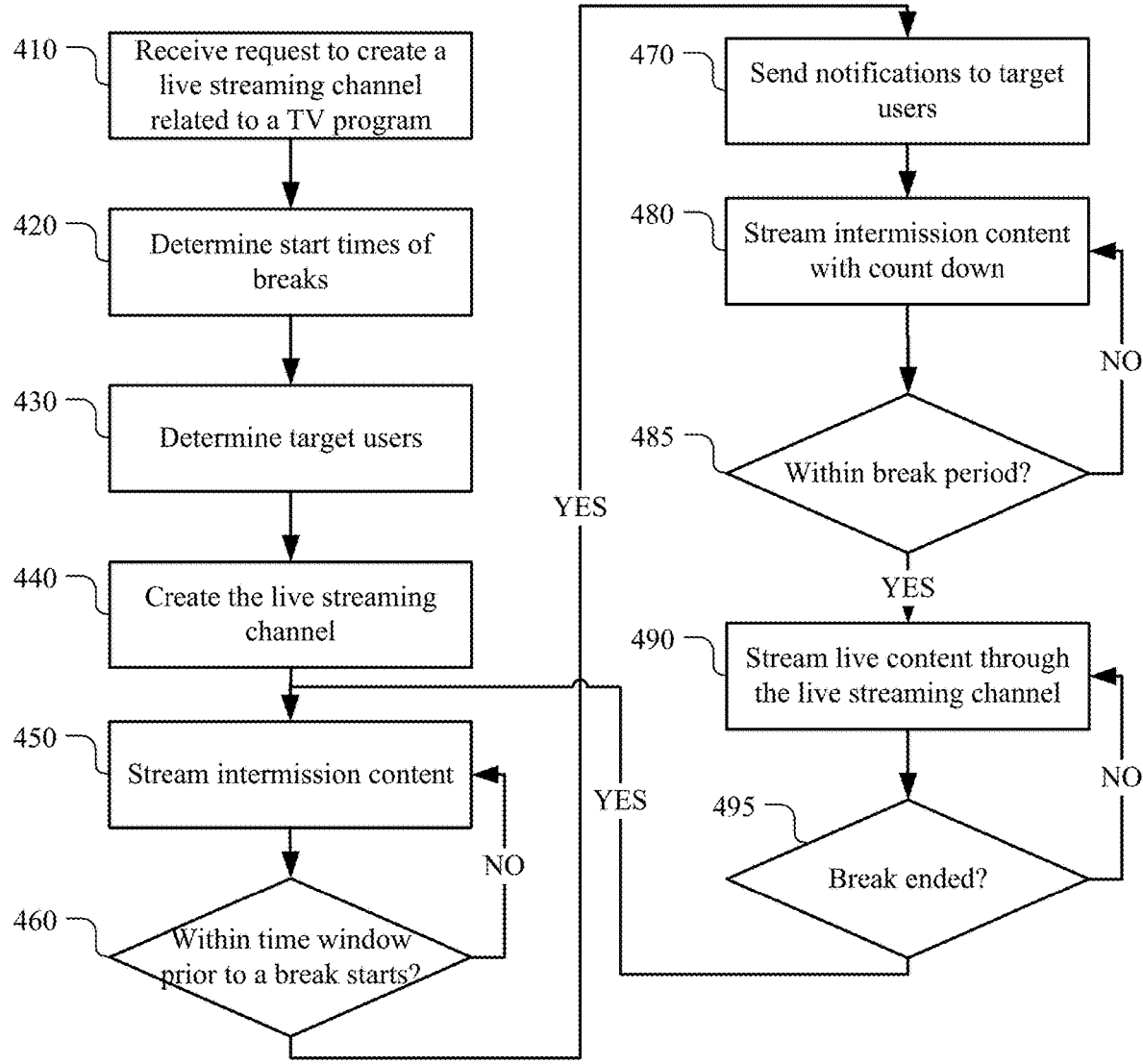
FIG. 4 illustrates an example method for integrating live streaming content with television programs.

FIG. 4 illustrates an example method 400 for integrating live streaming content with television programs. The method may begin at step 410, where a computing system associated with a social-media network may receive a request to create a live streaming channel associated with a television program. For example, a social-networking system may provide a Web-based or app-based user interface through which a user may submit a request to create a live streaming channel for a television program. Through the user interface, the user may enter a particular television program (e.g., by program title and starting and/or ending time) or select from a pre-populated list of television programs. In particular embodiments, the user's entry may be compared with a database of supported television programs (e.g., prime-time television programs or programs expected to have high viewership, each of which may be represented by a program identifier in particular embodiments) to identify the specific program of interest. In particular embodiments, the social-networking system set a limit on the number of live streaming channels that may be associated with a particular television program. In particular embodiments, users interested in creating live streaming channels for a particular television program may also request for notification exclusivity. For example, a user may wish to create a live streaming channel for Exciting Show, a prime-time television program, and request the social-networking system to only send notifications to social-networking users regarding the user's live streaming channel and no one else's, in accordance with particular embodiments. In particular embodiments, notification exclusivity may also be sliced based on demographics or characteristics of the target audience. For example, Amy and Bob may wish to create channel for female audience and a channel for male audience, respectively. Based on such requests, the social-networking system may send notifications for Amy's channel only to female users and send notifications for Bob's channel only to male users.

At step 420, the system may determine a plurality of breaks of the television program and their respective start times. For example, the social-networking system may query a server associated with the television program (e.g., a television network's server) to obtain information pertaining to the scheduled break times of the television and their respective start times. As an example, based on the information retrieved, the social-networking system may determine that the particular television program of interest, start at 7:00 pm on a particular date, may have 5 breaks, starting at 7:10 pm, 7:20 pm, 7:33 pm, 7:45 pm, and 7:58 pm, respectively. In particular embodiments, the system may also determine the duration and/or end times of each break. In particular embodiments, such information about the breaks may be inferred from information about the broadcast times of the actual program of interest. Continuing with the example above, based on information indicating that the actual program will be aired from 7:00 pm to 7:10 pm, 7:12 pm to 7:20 pm, etc., the system may infer that the first break starts at 7:10 pm and the second break starts at 7:20 pm, and so on. In particular embodiments, the system may also determine the breaks' start times and/or timeframes based on historical or statistical data. For example, to estimate the break times of a particular program, the system may track past break times of the same program or other programs sharing similar characteristics as the program of interest. For instance, the system may predict the break times for episode 4 of the Exciting Show based on observed break times of episodes 1, 2, and 3 of the Exciting Show. As another example, the prediction may be based on other programs aired during the same time slot (e.g., between 7:00 pm to 8:00 pm) and/or on the same channel as that of the program of interest.

In particular embodiments, the social-networking system may also use machine-learning models to predict the start times of breaks. For example, a machine-learning model (e.g., neural network) may be trained to receive as input various features of different television programs, such as their respective start times, end times, broadcast days (e.g., on Mondays, Saturdays, etc.), broadcast months or season (e.g., January to May), types, target demographics, features of other competing programs broadcast during the same or overlapping time slots, and any other relevant features. The output of the machine-learning model may be predicted break times. The training data used to train the machine-learning model may include, for example, a sufficiently large number of television programs (e.g., 100, 1000, etc.), each with a feature set as described above along with observed break times (the labels of the training data). After training, the machine-learning model may learn which features are predictive of the break times, and learn to output a set of break times given the features of a particular program of interest.

At step 430, the system may further identify a plurality of target users of a social-media network based on their respective user profiles, social-graph data, or activity patterns on the social-media network. In particular embodiments, the target users may be those who will receive notifications from the system regarding the live streaming channel associated with the television program. In particular embodiments, effectiveness of the notifications (e.g., as measured by the proportion of users receiving the notifications who ultimately visited the live streaming channel) may be improved by targeting users who are likely to be interested in the related television program. For example, the platform may target users whose social-networking profiles indicate that they are following or are fans of the television program. As another example, social graph data associated with a target user may indicate that the target user has many friends (e.g., other users who are within n-th degrees of separation from the target user) who are following or are fans of the television program. Based on such social-graph data, the system may determine that there is a good likelihood that the target user may also be interested in the television program. If the television program and/or the live streaming content are sponsored or associated with a particular brand, the platform may also target users who follow the brand or have friends who follow the brand.

In particular embodiments, the target users may also be identified using machine-learning models to automatically predict which users are likely interested in the television program or would be interested in the supplemental live streaming content. The machine-learning model may be configured to receive as input, e.g., a user's profile data (e.g., including age, gender, interests, living location, education and work background, social-network characteristics, etc.), profile data of friends, comments or other social engagement histories (e.g., the user may have previously commented on or referenced the television program on the social-networking platform), and any other suitable information associated with user. The machine-learning model may be configured to output a score that indicates a likelihood of the user being interested in the television program or a likelihood of the user responding to the notification and visiting the live streaming channel. The training data for the machine-learning model may include a sufficiently large number of users (e.g., 100, 1000, 10000, etc.) and their respective features, such as those mentioned above. Each user in the training data may further be labeled with their respective known interest levels in the television program and/or propensity to visit a related live streaming channel.

In particular embodiments, the social-networking system may also target users who are currently watching the television program. This may be achieved, for example, based on the users' activity patterns on the social-media network. For example, during the television program, the system may, in real time, determine a user's mobile activity or engagement pattern (e.g., interacting with the social-networking app installed on the user's device, turning on/off the display, scrolling through or interacting with newsfeeds provided through the social-networking system, etc.). If spikes in the user's activity or engagement coincide with the particular television program's breaks, the system may infer that there is a reasonable likelihood that the user is currently watching the television program. In particular embodiments, the system may also identify users who may be watching the show by reviewing messages posted or sent through the social-networking system during the television program and identifying those that are related to the television program. In particular embodiments, the system may also identify users who are watching the show by querying a smart television or television recording device on which an application associated with the social-media network is installed (e.g., the application may be granted access to data from the television or recording device indicating the channel to which the television or device is tuned). In particular embodiments, the social-networking system may look for users who are likely watching the television program throughout the duration of the television program, and notifying them of the concurrently-streaming live content related to the television program.

At step 440, the system may create the live streaming channel based on the user's request. In particular embodiments, this may involve initializing a live streaming channel on an associated streaming server. The live streaming channel may be associated with the television program of interest. Live content that the streaming server receives from the requesting user may be encoded into packets and distributed to any user who has established a session with the streaming channel. The live streaming channel may be created at any time, such as immediately after the request is received, when live content from the requesting user is being uploaded, at a user-specified time, at a predetermined amount of time prior to the start of the television program, or any other suitable time prior to content being streamed through the channel.

At step 450, the system, in particular embodiments, may stream intermission content through the live streaming channel when the television program is not on break. Since, from the perspective of the live streaming channel, the "main" live content is being streamed during the breaks of the associated television program, "intermission content" as used herein refers to any content that is streamed through the channel when the associated television program is not on break. Intermission content may include, for example, a splash screen, a static image, trivia, products that appeared on the television program, live video of a host watching the television program and commenting on the plot, or any other suitable content. In particular embodiments, intermission content may be streamed before the television program begins, prior to a predetermined time window prior to the start time of a break, prior to the start time of a break, or any other suitable time when the television program is not on break. In particular embodiments, the intermission content may also be received from the user, or the system may stream stocked system content through the live streaming channel.

At step 460, the system may determine whether the current time is within a predetermined time window prior to a start time of a break of the television program. Shortly before each break, the social-networking system may notify viewers that live content related to the television program is available through the live streaming channel. In particular embodiments, notifications may be sent based on determined start times of the commercial breaks. For example, upon determining that the current time is within a predetermined time window (e.g., 10, 30, or 60 seconds) prior to a start time of a break (e.g., 7:10 pm, 7:20 pm, etc.), the system may send notifications to the target users, as illustrated as step 470. Conversely, if it is not yet time to send notifications, intermission content may continue to be streamed, as represented in the flow diagram by the arrow going from block 460 to block 450, until such time arrives.

At step 470, the system may send notification to users via any suitable communication channel, such as, for example, posting on newsfeeds, sending in-app notifications, causing a pop-up notification to be displayed on the user's device, etc. In particular embodiments, each notification may include a link to the live streaming channel. When a recipient user activates the link, the recipient user may be redirected to a user interface (e.g., a web page, a surface screen in the user's mobile application, etc.) configured to present live content through the live streamlining channel. In particular embodiments, notifications may be sent during a predetermined time window prior to the start time of an upcoming break. In particular embodiments, notifications may be sent continuously during the break as well.

At step 480, the system may stream intermission content through the live streaming channel during the predetermined time window prior to the start time of the upcoming break. For example, while notifications are being sent during the time window, the live streaming channel may continue to stream the intermission content. In particular embodiments, during the time window, the intermission content may further include a count-down timer (e.g., counting down in seconds from 10, 9, 8, 7, and so on) to the start time of the upcoming break in the television program, which may correspond to the start time of the main live content that is to be streamed through the live streaming channel.

At step 485, the system may, in particular embodiments, check whether the anticipated break has begun, or whether the main live content is to begin streaming. Until such time, the system may continue to stream the intermission content, as represented by the arrow from block 485 to block 480 in FIG. 4. On the other hand, when the system determines that the time for streaming the live content has arrived, it may do so, as represented by the arrow from block 485 to block 490. In particular embodiments, the streaming of the live content may begin at a time based on the start time of the upcoming break. For example, the time for streaming the live content may coincide with the start time of the break or a predetermined amount of time prior to or after the start time of the break (e.g., the live content may start 3 seconds before the television program goes on break). In particular embodiments, at step 495, streaming of the live content may end at a time determined based on the anticipated end time of the break. For example, when the television break ends and the regular television program of interest resumes, the main live content of the live streaming channel may end. If the break has not yet ended, the system may continue to stream the live content, as represented by the arrow from block 495 to block 490. On the other hand, if the break has ended, the system, in particular embodiments, may again stream intermission content through the live streaming channel till the start time of the next break, as represented by the arrow from block 495, to block 450.

In particular embodiments, instead of checking whether the start time and/or end time of a break has occurred and streaming different types of content accordingly, the system may instead leave that decision to the user who is providing the live content. For example, the live streaming channel may continuously stream whatever the user uploads, being agnostic to the type of content uploaded and streamed. In this case, it may be up to the user to time when to or whether to alter the streamed content based on the status of the television program (e.g., whether the program of interest is being aired or whether the program is on break). This may provide the user more control over what end users experience.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for integrating live streaming content with television programs, including the particular steps of the method of FIG. 4, this disclosure contemplates any suitable method for integrating live streaming content with television programs, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
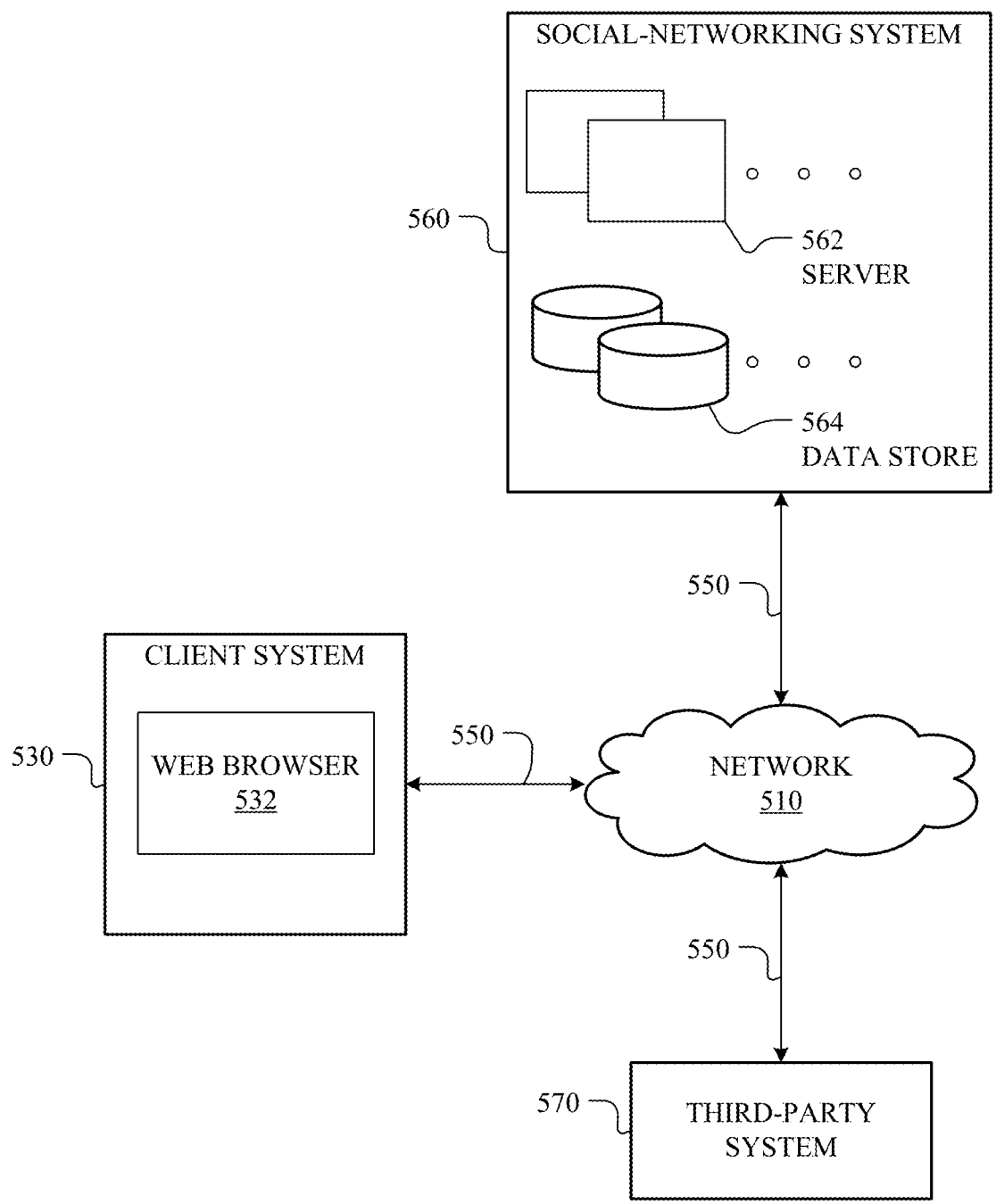
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, and may have one or more add-ons, plug-ins, or other extensions. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
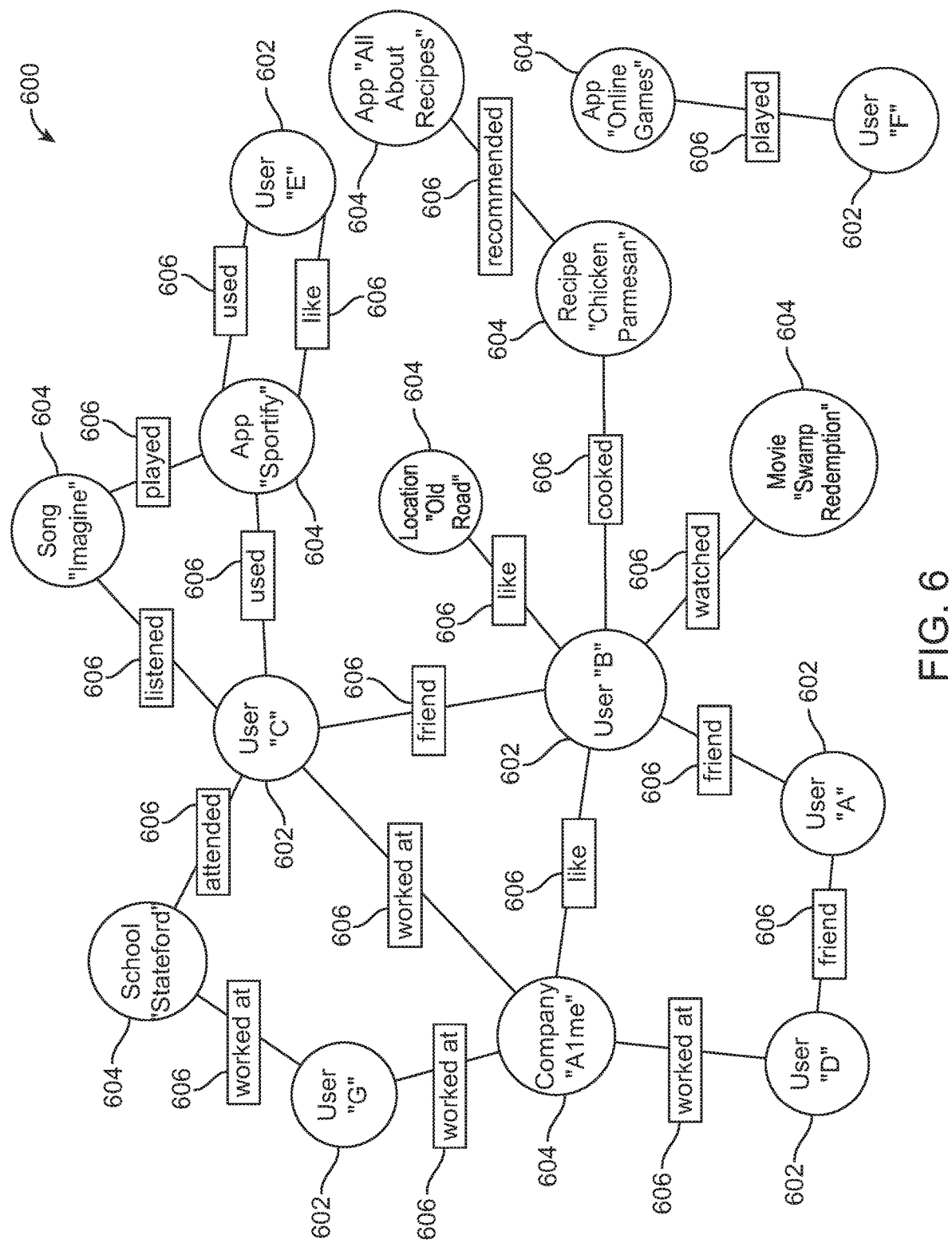
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606. The degree of separation between two objects represented by two nodes, respectively, is a count of edges in a shortest path connecting the two nodes in the social graph 600. As an example and not by way of limitation, in the social graph 600, the user node 602 of user "C" is connected to the user node 602 of user "A" via multiple paths including, for example, a first path directly passing through the user node 602 of user "B," a second path passing through the concept node 604 of company "Acme" and the user node 602 of user "D," and a third path passing through the user nodes 602 and concept nodes 604 representing school "Stanford," user "G," company "Acme," and user "D." User "C" and user "A" have a degree of separation of two because the shortest path connecting their corresponding nodes (i.e., the first path) includes two edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604.)

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

Figure 7:
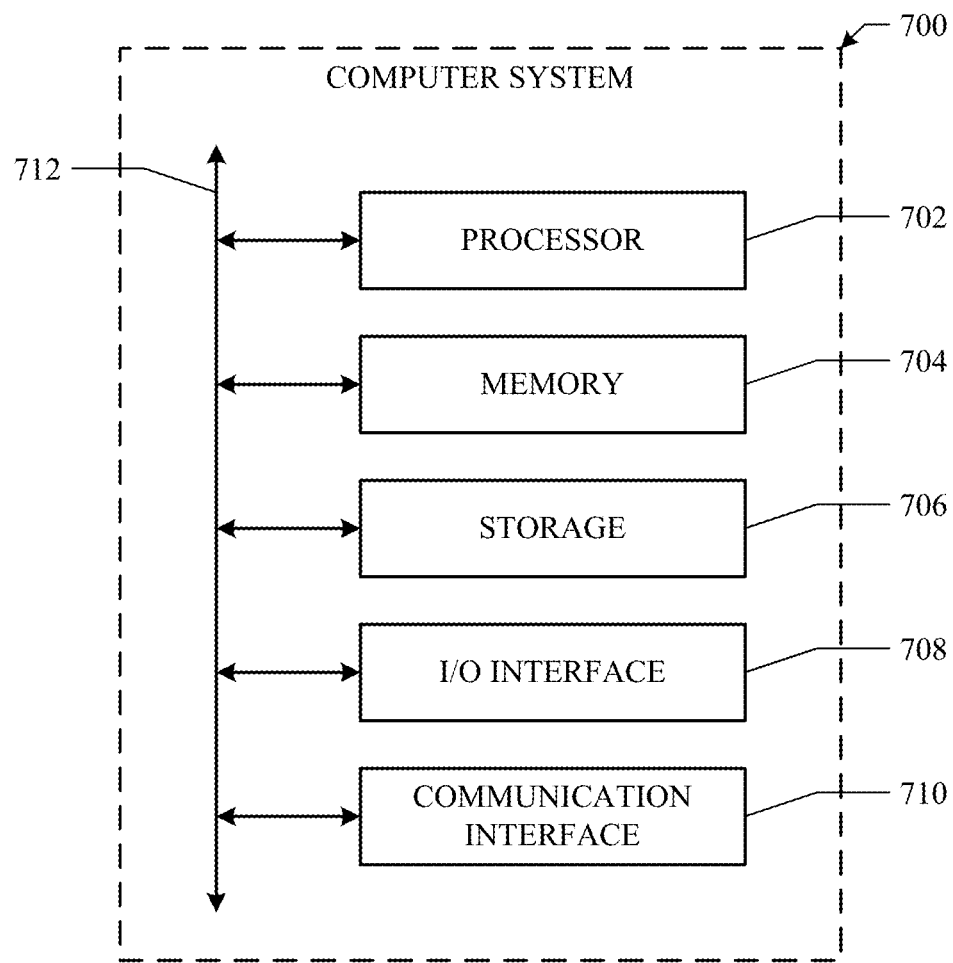
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   generating a forum for a discussion regarding a television program among a plurality of users watching the television program, wherein the television program is aired on a plurality of first devices;
   predicting an anticipated break during the television program;
   triggering, prior to the anticipated break, notifications on a plurality of second devices of the plurality of users watching the television program, the notifications being related to a start of a supplementary content relating to the television program to be aired during the anticipated break;
   providing, on the plurality of second devices, a user interface comprising (1) the supplementary content and (2) the forum for the discussion among the plurality of users, wherein the supplementary content is streamed within the user interface on the plurality of second devices of the users during the anticipated break of the television program being aired on the plurality of first devices;
   receiving, from a second device of the plurality of second devices of a user of the plurality of users, user input indicating a comment or a user emotion on the supplementary content relating to the television program through the user interface; and
   distributing in real-time the comment or the user emotion on the supplementary content relating to the television program received from the second device of the user across other ones of the plurality of second devices of other ones of the plurality of users watching the supplementary content during the anticipated break of the television program.

2. The method of claim 1, further comprising:
determining a start time of the anticipated break during the television program, wherein the start time is based on predictions from a social-media networking platform;
upon determining that a current time is within a predetermined time window prior to a first the start time of the anticipated break, sending the notifications to the plurality of second devices of the users watching the television program, wherein each of the notifications includes a link to a live streaming channel on the social-media networking platform;
receiving, from the second device of the plurality of second devices, a request for streaming the supplementary content related to the television program when the link to the live streaming channel is executed; and
streaming the supplementary content through the live streaming channel within the user interface on the second device during the anticipated break of the television program.

3. The method of claim 2, further comprising:
streaming intermission content through the live streaming channel prior to the streaming of the supplementary content related to the television program.

4. The method of claim 3, wherein the intermission content comprises a count-down timer to a start time of the supplementary content related to the television program.

5. The method of claim 1, wherein the user interface further comprises one or more affinity indicators for expressing user emotions on the supplementary content relating to the television program.

6. The method of claim 5, further comprising:
receiving, from one or more second devices, the user emotions on the supplementary content relating to the television program; and
overlaying emoticons corresponding to the user emotions received from the one or more second devices over the supplementary content.

7. The method of claim 5, wherein the one or more affinity indicators in the user interface are used to express surprise, a liking, anger, excitement, or amusement of the user of the plurality of users to the other ones of the plurality of users watching the supplementary content during the anticipated break of the television program.

8. The method of claim 1, wherein the supplementary content related to the television program is streamed during an entire runtime of the television program.

9. The method of claim 1, wherein the plurality of users watching the television program are identified based on activity patterns of the users on a social-media networking platform.

10. The method of claim 1, wherein the supplementary content relating to the television program comprises one or more of behind-the-scenes footages of the television program, conversation around scenes of the television program showed prior to the anticipated break, or commentaries of actors of the television program.

11. One or more computer-readable non-transitory storage media embodying software that is operable when executed to cause one or more processors to perform operations comprising:
generating a forum for a discussion regarding a television program among a plurality of users watching the television program, wherein the television program is aired on a plurality of first devices;
predicting an anticipated break during the television program;
triggering, prior to the anticipated break, notifications on a plurality of second devices of the plurality of users watching the television program, the notifications being related to a start of a supplementary content relating to the television program to be aired during the anticipated break;
providing, on the plurality of second devices, a user interface comprising (1) the supplementary content and (2) the forum for the discussion among the plurality of users, wherein the supplementary content is streamed within the user interface on the plurality of second devices of the users during the anticipated break of the television program being aired on the plurality of first devices;
receiving, from a second device of the plurality of second devices of a user of the plurality of users, user input indicating a comment or a user emotion on the supplementary content relating to the television program through the user interface; and
distributing in real-time the comment or the user emotion on the supplementary content relating to the television program received from the second device of the user across other ones of the plurality of second devices of other ones of the plurality of users watching the supplementary content during the anticipated break of the television program.

12. The media of claim 11, wherein the software is further operable when executed to cause the one or more processors to perform operations comprising:
determining a start time of the anticipated break during the television program, wherein the start time is based on predictions from a social-media networking platform;
upon determining that a current time is within a predetermined time window prior to the start time of the anticipated break, sending the notifications to the plurality of second devices of the users watching the television program, wherein each of the notifications includes a link to a live streaming channel on the social-media networking platform;
receiving, from the second device of the plurality of second devices, a request for streaming the supplementary content related to the television program when the link to the live streaming channel is executed; and
streaming the supplementary content through the live streaming channel within the user interface on the second device during the anticipated break of the television program.

13. The media of claim 11, wherein the user interface further comprises one or more affinity indicators for expressing user emotions on the supplementary content relating to the television program.

14. The media of claim 13, wherein the software is further operable when executed to cause the one or more processors to perform operations comprising:
receiving, from one or more second devices, the user emotions on the supplementary content relating to the television program; and
overlaying emoticons corresponding to the user emotions received from the one or more second devices over the supplementary content.

15. The media of claim 11, wherein the supplementary content relating to the television program comprises one or more of behind-the-scenes footages of the television program, conversation around scenes of the television program showed prior to the anticipated break, or commentaries of actors of the television program.

16. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:

generating a forum for a discussion regarding a television program among a plurality of users watching the television program, wherein the television program is aired on a plurality of first devices;

predicting an anticipated break during the television program;

triggering, prior to the anticipated break, notifications on a plurality of second devices of the plurality of users watching the television program, the notifications being related to a start of a supplementary content relating to the television program to be aired during the anticipated break;

providing, on the plurality of second devices, a user interface comprising (1) the supplementary content and (2) the forum for the discussion among the plurality of users, wherein the supplementary content is streamed within the user interface on the plurality of second devices of the users during the anticipated break of the television program being aired on the plurality of first devices;

receiving, from a second device of the plurality of second devices of a user of the plurality of users, user input indicating a comment or a user emotion on the supplementary content relating to the television program through the user interface; and distributing in real-time the comment or the user emotion on the supplementary content relating to the television program received from the second device of the user across other ones of the plurality of second devices of other ones of the plurality of users watching the supplementary content during the anticipated break of the television program.

17. The system of claim 16, wherein the processors are further operable when executing the instructions to perform operations comprising:

determining a start time of the anticipated break during the television program, wherein the start time is based on predictions from a social-media networking platform;

upon determining that a current time is within a predetermined time window prior to the start time of the anticipated break, sending the notifications to the plurality of second devices of the users watching the television program, wherein each of the notifications includes a link to a live streaming channel on the social-media networking platform;

receiving, from the second device of the plurality of second devices, a request for streaming the supplementary content related to the television program when the link to the live streaming channel is executed; and streaming the supplementary content through the live streaming channel within the user interface on the second device during the anticipated break of the television program.

18. The system of claim 16, wherein the user interface further comprises one or more affinity indicators for expressing user emotions on the supplementary content relating to the television program.

19. The system of claim 18, wherein the processors are further operable when executing the instructions to perform operations comprising:

receiving, from one or more second devices, the user emotions on the supplementary content relating to the television program; and overlaying emoticons corresponding to the user emotions received from the one or more second devices over the supplementary content.

20. The system of claim 16, wherein the supplementary content relating to the television program comprises one or more of behind-the-scenes footages of the television program, conversation around scenes of the television program showed prior to the anticipated break, or commentaries of actors of the television program.

* * * * *